UNITED STATES PATENT OFFICE.

CHARLES R. BLUNDELL, OF TUCSON, ARIZONA, ASSIGNOR OF ONE-HALF TO WM. J. BRYAN, JR., OF TUCSON, ARIZONA.

ART OR PROCESS OF MAKING AND EXTRACTING THE MEDICINAL PROPERTIES OF THE LARREA MEXICANA OR HEDIONDA.

1,250,132.  Specification of Letters Patent.  Patented Dec. 18, 1917.

No Drawing.  Application filed July 17, 1917.  Serial No. 181,151.

*To all whom it may concern:*

Be it known that I, CHARLES RIDGEWAY BLUNDELL, a citizen of the United States, residing at Tucson, Pima county, State of Arizona, have invented certain new and useful Improvements in the Art or Process of Making and Extracting the Medicinal Properties of the *Larrea Mexicana* or Hedionda, of which the following is a specification.

The *Larrea Mexicana* or hedionda is an evergreen shrub, common in arid and semi-arid regions, and a characteristic feature of the desert landscape. It is from three to ten feet high with many little branches, with blackish knots at the joints, clothed with sticky, dull yellowish-green foliage, the thickish, resinous leaflets very small, in pairs, with almost no leaf-stalk, and uneven at base. The flowers are nearly an inch across with bright yellow petals, with claws, and silky greenish-yellow sepals. The ovary is covered with pale silky hairs, so that the older flowers have a silky tuft in the center, and become a round, hairy fruit, with a short stalk, tipped with the slender style.

The properties are medicinal. It yields an aromatic yellowish resin in extract, a thin yellowish essential oil, slight traces of tannin, and a considerable percentage of chloryphyl and salts. The leaves and stems have long been used by the Indians in the form of a poultice for remedial effects in rheumatism and local inflammation. The process which I have invented and for which I claim patent is the only one by which complete extraction of these medicinal properties is obtained in a form which permits of their use for inflammation of the respiratory tracts, catarrhal troubles, intestinal inflammation, diseases of the arteries and renal complications. This process is as follows:

I.

The fresh gathered leaves and stems, after being washed and cleansed of dirt, are put through a grinder (the kind not being important) and reduced to the thinnest possible pulp.

II.

This pulp is then placed in a transparent colorless glass container and covered with a pure white paraffin oil, in the proportion of two parts pulp to one of oil. This container is then exposed to direct solar rays for a period of twelve hours.

III.

A further and complete extraction of medicinal properties is had by the further heating of the container in a water bath, at a temperature of not more than 212° F. for a period of two hours.

IV.

The oil extract with its pulp is permitted to cool to a temperature of approximately 80° F. and thereupon is placed in a press (the kind not being important) and by means of continuously applied pressure, all the oil is removed and collected. This oil is then placed in a centrifuge and the resinous solids separated from it. The result is a clear greenish yellow oil, which is now decanted and ready to use.

V.

The resinous solids, separated by the centrifuge, contain medicinal properties, and when united with a suitable carrier or binder make an efficacious remedy for piles and ulcers. The resulting oil product is highly medicinal, and its application is effective in rheumatism, pleurisy, tuberculosis, sprains and all inflammatory conditions of the thoracic and abdominal viscera. Readily absorbed, it acts as an anti-acid antiseptic in rheumatoid diseases and eccelerates the restoration to normal through the lymphatics. It is absorbent in glandular infections and hastens resolution in pleuritic and pneumonic attacks. Inhaled or otherwise directed to the mucous membrane of the nose, throat and bronchii its effects are sedative, at the same time causing an increased activity of those mucous surfaces and an immediate relief of congestion.

What I claim is:

The process of extracting the medicinal properties of the *Larrea Mexicana* consisting in subjecting the ground pulp of the plant saturated with paraffin oil of a specific gravity of 0.900 to direct solar rays for a period of twelve hours, heating to 212° F. for a period of two hours, cooling to approximately 80° F., pressing, and ridding the mixture of resinous solids by centrifuging.

In testimony whereof, I hereby affix my signature in presence of two witnesses.

C. R. BLUNDELL.

Witnesses:
WM. J. BRYAN, Jr.,
ADELINE BOTTS.

Copies of this patent may be obtained for five cents each, by addressing the "Commissioner of Patents, Washington, D. C."